United States Patent
Pai et al.

(10) Patent No.: US 10,614,130 B1
(45) Date of Patent: Apr. 7, 2020

(54) CONTENT RECOMMENDATION USING LAYERED TYPES

(71) Applicants: Yogish Pai, Los Gatos, CA (US); Steve George Goyette, Maple Ridge (CA); Robert Bruce MacMartin, Delta (CA)

(72) Inventors: Yogish Pai, Los Gatos, CA (US); Steve George Goyette, Maple Ridge (CA); Robert Bruce MacMartin, Delta (CA)

(73) Assignee: Intuit Inc., Mountain View, CA (US)

( * ) Notice: Subject to any disclaimer, the term of this patent is extended or adjusted under 35 U.S.C. 154(b) by 416 days.

(21) Appl. No.: 15/418,674

(22) Filed: Jan. 27, 2017

(51) Int. Cl.
*G06F 16/9032* (2019.01)
*G06F 16/29* (2019.01)
*G06F 16/903* (2019.01)

(52) U.S. Cl.
CPC ........ *G06F 16/90324* (2019.01); *G06F 16/29* (2019.01); *G06F 16/90335* (2019.01)

(58) Field of Classification Search
CPC combination set(s) only.
See application file for complete search history.

(56) References Cited

U.S. PATENT DOCUMENTS

| | | | | |
|---|---|---|---|---|
| 2009/0216867 | A1* | 8/2009 | Pusateri | H04L 41/022 709/222 |
| 2012/0265744 | A1* | 10/2012 | Berkowitz | G06Q 30/06 707/705 |
| 2015/0088968 | A1* | 3/2015 | Wei | H04L 67/10 709/203 |
| 2016/0034490 | A1* | 2/2016 | Woo | G06F 16/178 707/634 |
| 2016/0110467 | A1* | 4/2016 | Hern | G06K 7/1447 235/375 |
| 2016/0253679 | A1* | 9/2016 | Venkatraman | G06Q 30/0185 705/310 |
| 2016/0358230 | A1* | 12/2016 | Wilson | G06Q 30/0277 |
| 2018/0184169 | A1* | 6/2018 | Maughan | G06Q 30/02 |
| 2018/0218037 | A1* | 8/2018 | Marquardt | G06F 16/2228 |

\* cited by examiner

*Primary Examiner* — Shyue Jiunn Hwa
(74) *Attorney, Agent, or Firm* — Ferguson Braswell Fraser Kubasta PC

(57) ABSTRACT

A method to configure a localizable software solution, which includes receiving a search request to search a requested type of configuration data items, accessing a first configuration data item of the requested type, in response to the search request, scanning contents of the first configuration data item to identify a key within the first configuration data item, accessing, by resolving the key within the first configuration data item and based on the at least one user attribute, a second configuration data item of a second type, generating a custom configuration data item by replacing, within the first configuration data item, the key with the second configuration data item, and returning the custom configuration data item to a configuration engine. The configuration engine localizes the localizable software solution using the custom configuration data item.

18 Claims, 10 Drawing Sheets

CONTENT RECOMMENDATION USING LAYERED TYPES

BACKGROUND

Local regulations and/or norms exist throughout various geographical or jurisdictional regions for conducting business. A product or solution marketed or used in each region needs to comply and/or support the local regulation/norm to be competitive. Similarly, different types of users of a software solution may have different requirements for various aspects of the software solution. A software solution targeting multiple types of users must support the varying requirements of the users in order to be competitive. However, creating multiple static, region-specific versions of the same content for all the types of users is time-intensive and requires a significant amount of storage space and programming coordination. Also, maintaining multiple static, region-specific versions of the same content presents onerous maintenance and management requirements in order to keep each piece of content up-to-date and consistent for all of the users of the software solution.

SUMMARY

In general, in one aspect, the invention relates to a method to configure a localizable software solution. The method comprises receiving a search request to search a requested type of configuration data items. The search request includes at least one user attribute. The method further comprises accessing a first configuration data item of the requested type, in response to the search request. The method further comprises scanning contents of the first configuration data item to identify a key within the first configuration data item. The method further comprises, accessing, by resolving the key within the first configuration data item and based on the at least one user attribute, a second configuration data item of a second type. The method further comprises generating a custom configuration data item by replacing, within the first configuration data item, the key with the second configuration data item. The method further comprises returning the custom configuration data item to a configuration engine. The configuration engine localizes the localizable software solution using the custom configuration data item.

In general, in one aspect, the invention relates to a system to configure a localizable software solution. The system comprises a hardware processor and memory. The system further comprises a localizable software solution. The system further comprises a configuration engine operable to configure the localizable software solution. The system further comprises a repository. The system further comprises software instructions stored in the memory and configured to execute on the hardware processor, which when executed cause the hardware processor to receive a search request to search a requested type of configuration data items. The search request includes at least one user attribute. The software instructions further cause the processor to access a first configuration data item of the requested type, in response to the search request. The software instructions further cause the processor to scan contents of the first configuration data item to identify a key within the first configuration data item. The software instructions further cause the processor to access, by resolving the key within the first configuration data item and based on the at least one user attribute, a second configuration data item of a second type. The software instructions further cause the processor to generate a custom configuration data item by replacing, within the first configuration data item, the key with the second configuration data item. The software instructions further cause the processor to return the custom configuration data item to a configuration engine. The configuration engine localizes the localizable software solution using the custom configuration data item.

In general, in one aspect, the invention relates to a non-transitory computer readable medium comprising instructions for configuring a localizable software solution. The instructions comprise receiving a search request to search a requested type of configuration data items. The search request includes at least one user attribute. The instructions further comprise accessing a first configuration data item of the requested type, in response to the search request. The instructions further comprise scanning contents of the first configuration data item to identify a key within the first configuration data item. The instructions further comprise, accessing, by resolving the key within the first configuration data item and based on the at least one user attribute, a second configuration data item of a second type. The instructions further comprise generating a custom configuration data item by replacing, within the first configuration data item, the key with the second configuration data item. The instructions further comprise returning the custom configuration data item to a configuration engine. The configuration engine localizes the localizable software solution using the custom configuration data item.

Other aspects of the invention will be apparent from the following detailed description and the appended claims.

DETAILED DESCRIPTION

Figure 1A:
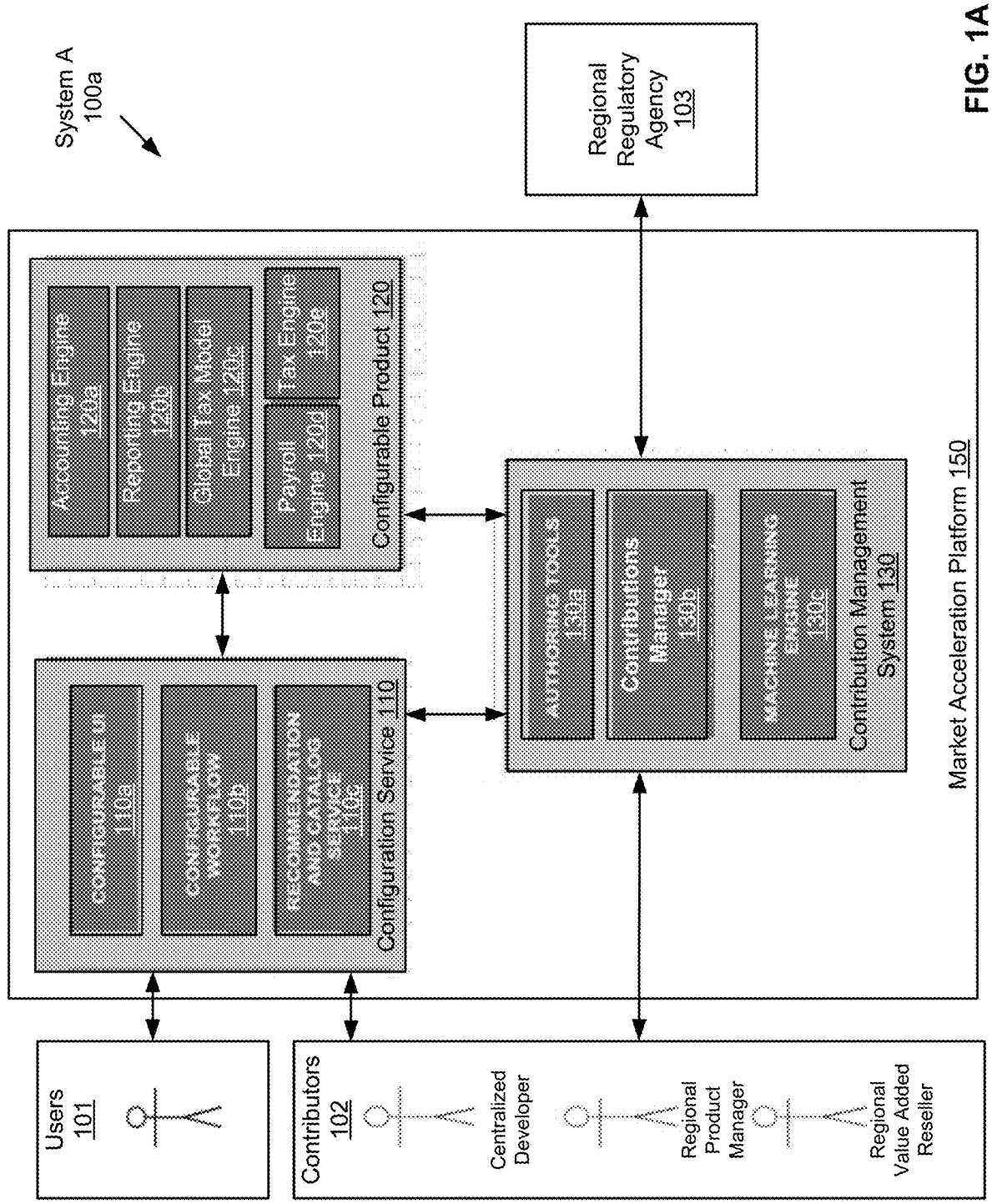
FIG. 1A shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout this disclosure, the terms "internationalization" and "localization" refer to adapting computer software to different languages, regional differences, and regulatory requirements of a target market, such as a geographical or jurisdictional region. Internationalization involves the process of designing a software solution so that the application can be adapted to various regional requirements without substantial engineering changes. Localization is the process of adapting internationalized software for a specific region by adding locale-specific segments and translating text based on a language specific to the region. Throughout this disclosure, the term "geographic region" refers to a region with a set of regulatory requirements/laws under the control of a system of courts or government entity which are different from neighboring regions (e.g., European Union, England, France, Asia-Pacific countries, China, Hong Kong, North American Free Trade Agreement countries, United States, Canada, Mexico, etc.). Generally, the regulatory requirements are imposed on local business entities to report various regulated aspects of their business activities on a periodic basis. For example, a tax jurisdiction corresponds to a region where the regulatory requirements include a set of tax laws under the control of local government entities.

In one or more embodiments of the invention, the terms "internationalization" and "localization" are collectively referred to as "scaling" a software solution. Aspects of this disclosure focus on the global scaling of a software solution designed and provided centrally by the software provider. In one or more embodiments, scaling also refers to adapting a hardware product to different languages, regional differences, and regulatory requirements of a target market, such as a geographical or jurisdictional region.

There is a secular shift to cloud adoption in progress worldwide in the small business space. A globally scaled software solution including a cloud-based financial management solution for small businesses across the world, such as a software solution that speaks the local language, is compliant to the local norms and regulations, and greatly simplifies worldwide users' bookkeeping and accounting responsibilities while allowing them to focus on running their business and serving their customers. The market opportunity provided by the secular shift to the cloud is a massive one. A software provider in the domestic market may easily become the same trusted brand to small businesses worldwide, including developed economies such as those of the European Union, as well as rapidly emerging economies such as Brazil and India.

Embodiments of the invention provide a method, system, and computer readable medium for customizing a software solution based on user contributions. In one or more embodiments of the invention, a customizable feature of the software solution is configured for a user based on customization of the software made by similar users, i.e., users within a similar region and/or having a similar business requirement. For a software solution, the customizable feature of the product corresponds to a user interface, a business workflow, a tax structure, or a report layout of an internationalized online financial solution, each or a portion of which is configured in the localization process to comply with jurisdictional requirements of a geographic region. Moreover, each customizable feature may be independently selected relative to the other features selected for the user. This independent selection of one or more features is done using layered types, which are recursively resolved based on user contribution data items. The localized version of the software solution that includes the customizable feature(s) is provided to the appropriate users seamlessly without re-programming the software solution.

The aforementioned user contributions include configuration data items generated and submitted by contributing users to configure a software solution based on local requirements of the contributing users. In one or more embodiments, the configuration data items are indexed based on contributing users' attributes and cataloged in a graph database. The graph database is a database that uses graph structures for semantic queries where nodes, links, and properties are used to represent and store data. Accordingly, the graph structure is used to select a configuration data item in response to a query from an adopting user. The selected configuration data item is then used to configure the software solution for the adopting user without requiring the adopting user to generate any additional configuration data item.

FIG. 1A depicts a schematic block diagram of a system A (100*a*) in accordance with one or more embodiments of the invention. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system A (100*a*) includes a configuration service (110), a configurable product (120), a contribution management system (130), a regional regulatory agency (103), users (101), and contributors (102). In one or more embodiments of the invention, various portions of the system A (100*a*) are coupled via a computer network (not shown). For example, the computer network may include wired and/or wireless portions of a public and/or private data network, such as wide area networks (WANs), local area networks (LANs), Internet, etc. In one or more embodiments of the invention, various portions of the system A (100*a*) collectively form a Market Acceleration Platform (MAP) (150). Each of these portions is described in detail below.

The MAP (150) allows a software provider to enter new markets quickly, with low cost and high quality, as well as to stay compliant in a variety of markets in real time after entry. The MAP (150) allows the software provider to overcome barriers encountered by prior approaches, such as monolithic, inflexible, non-extensible, everything-in-code implementation approaches. The MAP (150) solves the issues of these prior approaches taking a metadata-driven, configurable approach to product development that leverages the common themes in product requirements to maximize code re-use through configuration, enables product extensibility to create user-level configuration, and facilitates product enrichment/refinement by a worldwide network of third-party developers, local market experts (e.g., local accountants), and small business end users. In other words, with the gain in speed and flexibility in product development, the MAP (150) allows the software provider to explore decentralized, parallelized go-to-market strategies.

The key principles that guide the technology and architecture of the MAP (150) include at least one or more of the following:

a. designing the platform features that enable configurability to be domain-agnostic and re-usable across in-house developers of the software provider;

b. developing the platform features in a just-in-time fashion staying in tune with the needs of the products/offerings;

c. developing domain specific capabilities in a manner that is configurable;

d. defining the configuration metadata language/syntax in a manner that is coherent, specific where needed, and extensible where appropriate;

e. designing for enterprise-to-enterprise (E2E) performance such that the offerings are configurable and metadata driven with consideration for performance impact and appropriate measures of near-caching and far-caching strategies;
f. progressively investing in authoring tools that allow non-engineers to specify software configurations; and/or
g. allowing incremental support of a newly identified local requirement to be configurable at runtime to the extent possible, and not depend on formal software release cycles.

As to be expected, there are significant differences (i.e., variances) in terms of what the scalable software product needs to support in each market in order to be competitive. At a high-level, from the ecosystem perspective, the aspects that exhibit the most variance include bank feeds, data-in/data-out variability (import/export), billing, payments, and compliance variance in local accounting and payroll. In summary, the MAP (150) focuses on clearly identifying and delineating the areas of variance, solidifying the non-varying core, and providing an architecture that exploits the commonality across markets while allowing the software product to be configured and extended to implement the variances.

For example, the major areas of variance may include a chart of accounts, indirect taxes, reports, and transaction forms. Each of these areas is described below.

Chart of Accounts—A chart of accounts is a foundational feature of many accounting solutions and refers to the list of accounts created by a business to record transactions for income and expense in a collection of accounting records commonly referred to as the general ledger. Across the global markets, the chart of accounts may vary from being very flexible (e.g., in the United States) to being highly prescriptive (e.g., France and other European Union countries).

Indirect Taxes—An indirect tax is commonly defined as an indirect tax that is collected by an intermediary (e.g., a retail store) from the person (e.g., a consumer) who bears the ultimate economic burden of the tax. Examples of the indirect tax include sales tax, value added tax (VAT), goods and services tax (GST), and other specific taxes. The indirect tax may be levied at the point-of-sale or at the time of invoicing. A business, acting as a tax collector for a tax agency, is required to maintain accurate accounting for and to track and report such taxes collected in compliance with local norms and standards. Specifically, the business is required to perform necessary filings and submit associated tax payments to the applicable agencies.

Reports—Reports are another critical aspect of variance across markets, and form a core feature that enables small businesses to gain critical insight into how their business is performing. Some examples of common reports include profit-and-loss report, balance sheet, cash-flow report, etc.

Transaction Forms—Transaction forms are the primary means of representing the activities a small business has with customers and vendors. Examples of transaction forms include invoices, sales receipts, etc. These forms may exhibit a high degree of variance from market to market and are a prime candidate to be made configurable.

Continuing with FIG. 1, the MAP (150) includes hardware and software for executing the configuration service (110), configurable product (120), and contribution management system (130). In one or more embodiments, the MAP (150) includes a web-based solution such that the users (101) and contributors (102) interact with the MAP (150) using web browsers on respective user devices (e.g., computing and communication devices). In one or more embodiments, the computing and communication devices includes a desktop computer, notebook computer, tablet computer, or other suitable mobile computing devices such as a smartphone. In one or more embodiments, a copy of at least a portion of the MAP (150) is downloaded onto user devices where the users (101) and contributors (102) interact with the downloaded copy via a user interface (UI) menu displayed on the user device.

The configurable product (120) is a software solution, such as an accounting software, a financial software, a web service, or any other solution. In one or more embodiments of the invention, the configurable product (120) includes one or more configurable engines, such as an accounting engine (120a), a reporting engine (120b), a global tax model engine (120c), a payroll engine (120d), and a tax engine (120e) that perform various functions of the configurable product (120). In this context, these configurable engines are also referred to as functional engines of the configurable product (120). In one or more embodiments, these configurable engines include customizable features, such as a tax structure, a report layout, a calculation formula, or any other jurisdiction/region dependent component.

The customizable features are customized by the users (101) and/or contributors (102) to configure a customized copy of the configurable product (120) for performing a pre-determined task. For example, the pre-determined task may include generating a sales or purchase document (e.g., invoice, purchase order, sales order, receipt, payment request, etc.), preparing a tax agency filing (e.g., income tax filing, sales tax filing, etc.), preparing an accounting report (e.g., proposal, quotation, billing statement, payable report, expense report, etc.), etc. according to tax jurisdiction or other regulatory requirements of a particular geographical region. For example, the customizable feature may be a tax structure and performing the pre-determined task within the geographical region may include at least calculating a tax amount based on a customizable tax rate in the tax structure.

Continuing with FIG. 1A, the users (101) are individuals or business entities that use the configurable product (120). In addition, the contributors (102) are individuals or business entities who contribute to localization or other customization of the configurable product (120). Some of the users (101) and contributors (102) may be members of a user community. The user community may be, for example, a group of accountants working in a particular geographical region who jointly contribute to localization of the configurable product (120) such that the resultant localized version of the configurable product (120) is shared within the user community. Other examples of the contributors (102) include an engineer (referred to as centralized developer), a regional product manager, and/or a regional value added reseller of the software provider providing the configurable product (120). In one or more embodiments, a single configurable product (120) is localized into multiple local versions each applicable to one of many geographical regions worldwide. In particular, each local version is localized from the single configurable product (120) based on contributions from multiple regional product managers, multiple regional value added resellers, and/or other multiple contributing users located in the corresponding geographical region. In this context, each corresponding geographical region is referred to as a local market among a large number of local markets of the configurable product (120) throughout the world.

The users (101) and contributors (102) are equipped with computing and communication devices (not shown) for interacting with the MAP (150). For example, the contributors (102) may use the computing and communication devices to submit explicit contributions to the MAP (150) for localization of the configurable product (120). In one or more embodiments, the users (101) use the computing and communication devices to access the MAP (150) and manually customize the configurable product (120). Information regarding such manual customization may be captured by the MAP (150) as implicit contributions for localization of the configurable product (120).

The configuration service (110) includes configurable user interfaces (UIs) (e.g., configurable UI (110a)), configurable workflows (e.g., configurable workflow (110b)), and a recommendation and catalog service (110c). In one or more embodiments, the configuration service (110), more specifically the recommendation and catalog service (110c), is configured to organize a set of configurable UIs and a set of configurable workflows that are indexed, or otherwise cataloged, based on user attributes. In one or more embodiments, the configurable UI (110a) is a graphical user interface for the user to interact with the configurable product (120). The configurable workflow (110b) is a sequence of actions undertaken by the configurable product (120) according to business logic to perform the aforementioned pre-determined task. Additional details of the configuration service (110), more specifically the recommendation and catalog service (110c), are described in reference to FIG. 1B below.

Continuing with FIG. 1A, in one or more embodiments, the user attributes include a geographical region, a business characteristic, or other aspects of each of the users (101). The configuration service (110), more specifically the recommendation and catalog service (110c), may be configured to select, based on a user attribute of a user, the configurable UI (110a) from a set of configurable user interfaces of the configurable product (120).

The configuration service (110), more specifically the recommendation and catalog service (110c), is configured to select, based on a user attribute of a user, a configurable workflow (110b) from a set of configurable workflows of the configurable product (120). In one or more embodiments, the set of configurable user interfaces and the set of configurable workflows of the configurable product (120) are stored in a data repository (not shown) of the MAP (150). In one or more embodiments, the data repository may include a disk drive storage device, a semiconductor storage device, a database management system, other suitable computer data storage device, or combinations thereof. In one or more embodiments, content stored in the data repository may be a data file, a linked list, a data sequence, a database, a graphical representation, or any other suitable data structure. In one or more embodiments of the invention, the data repository includes functionality to store data for the MAP (150). In one or more embodiments, the aforementioned set of configurable UIs, configurable workflows, and other configuration parameters are stored, as configuration data items that are retrievable based on the user attributes, in a graph database in the data repository of the MAP (150).

In one or more embodiments, the user attribute includes a geographical region of the user. In such embodiments, the configurable UI (110a) and the configurable workflow (110b) are defined based on at least a compliance requirement of the geographical region, and/or a language of the geographical region. In one or more embodiments, the user attribute includes a business characteristic of the user. In such embodiments, the configurable UI (110a) and the configurable workflow (110b) are defined based on the business characteristic of the user.

The configurable product (120) performs the aforementioned pre-determined task of the user by first configuring one or more configurable engines based on the user attribute of the user. Subsequent to configuring the configurable engines, the configurable product (120) performs the pre-determined task by receiving one or more user inputs via the selected configurable UI (110a) and executing one or more configurable engines based on the received user inputs according to the selected configurable workflow (110b).

Continuing with FIG. 1A, the contribution management system (130) includes authoring tools (130a), a contributions manager (130b), and a machine learning engine (130c). Each of these elements is described below.

The authoring tools (130a) are configured to obtain, from a contributing user (e.g., one of the contributors (102)), a suggestion to customize the configurable product (120). In particular, the suggestion is based on a business requirement specific to the user attribute of a user. In one or more embodiments, the contributing user shares the same user attribute of the user and possesses expertise with respect to the business requirement specific to the user attribute. In one or more embodiments, the contributing user has different user attributes than the user but still possesses expertise with respect to the business requirement specific to the user attribute. In one or more embodiments, the contributing user provides the suggestion based on a request from the MAP (150). In this context, the suggestion is referred to as an explicit contribution.

The contributions manager (130b) is configured to obtain, from a moderator user (e.g., one of the contributors (102)) and in response to the moderator user reviewing the business requirement specific to the user attribute of the user, a moderator input regarding the suggestion. Accordingly, the contributions manager (130b) generates one or more configurable UIs, one or more configurable workflows, and/or one or more configuration parameters based at least on the suggestion and the moderator input. For example, the suggestion may explicitly specify an element of the configurable UI (110a), a step or sequence of the configurable workflow (110b), and/or one or more configuration parameters. In addition, the moderator input includes an approval of the specified UI element, workflow step/sequence, and/or configuration parameter. In one or more embodiments, the configuration parameters are data items used to customize one or more of the functional engines of the configurable product (120). In this context, the configuration parameters are referred to as metadata for customizing the functional engines of the configurable product (120).

Continuing with FIG. 1A, the contributions manager (130b) generates the configurable UIs, configurable workflows, and/or configuration parameters using the machine learning engine (130c). In one or more embodiments, the machine learning engine (130c) is configured to generate a statistical measure of the users (101) by tracking/monitoring/analyzing (i.e., "learning") the behavior of how the users (101) use the configurable product (120).

Specifically, the statistical measure represents a statistical behavior of the users (101) using the set of configurable UIs, the set of configurable workflows, and the configuration parameters of the configurable product (120) to perform the aforementioned pre-determined task. In this context, the users (101) are said to provide implicit contributions for localizing/customizing the configurable product (120) during the course of using the configurable product (120). For example, the statistical measure may include a statistical distribution of user selections among the configurable UIs, configurable workflows, and configuration parameters. In addition, the statistical measure may further include a correlation between the statistical distribution and user attributes of the users (101).

The machine learning engine (130c) may be further configured to verify the set of configurable UIs, the set of configurable workflows, and the set of configuration parameters based on the statistical measure. For example, each configurable UI, configurable workflow, and/or configuration parameter may correspond to a correlation between user attributes and selections among the configurable UIs, configurable workflows, and configuration parameters.

In summary, the contribution management system (130) verifies the set of configurable user interfaces, the set of configurable workflows, and the set of configuration parameters using a machine learning algorithm that is based on at least the user attributes of the users (101) and the contributing user attributes of the contributors (102) who submitted corresponding implicit and explicit contributions. Accordingly, the configuration service (110) may select, as a recommendation to a user, the configurable UI (110a), the configurable workflow (110b), and other corresponding configuration parameters that are organized/indexed in the aforementioned data repository of the MAP (150) by matching the user to the user attributes and contributing user attributes who have contributed the implicit and explicit contributions.

In one or more embodiments, the contributions manager (130b) is further configured to obtain the aforementioned compliance requirement from a regional regulatory agency (103) or other third party in the geographical region.

Figure 1B:
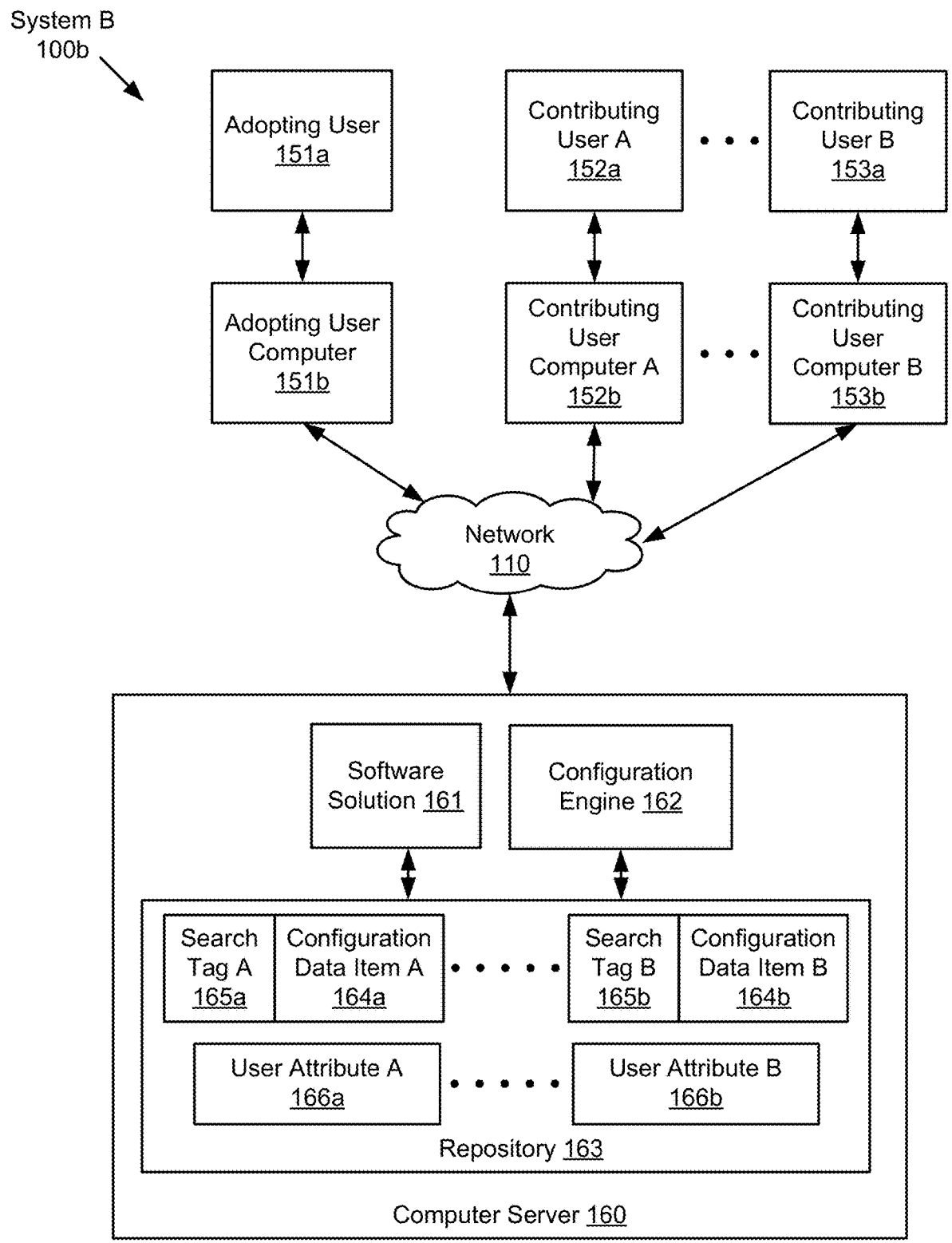
FIG. 1B shows a schematic diagram of a system in accordance with one or more embodiments of the invention.

FIG. 1B shows a block diagram of a system B (100b) in accordance with one or more embodiments of the invention. In particular, FIG. 1B shows an implementation of the MAP (150) depicted in FIG. 1A above. Specifically, the system B (100b) includes users (e.g., adopting user (151a), contributing user A (152a), contributing user B (153a), etc.), users' computing devices (e.g., adopting user computer (151b), contributing user computer A (152b), contributing user computer B (153b), etc.), and a computer server (160) that are coupled via a network (110). The computer server (160) includes a software solution (161), a configuration engine (162), and a repository (163). In one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet. In one or more embodiments of the invention, one or more of the modules and elements shown in FIG. 1B may be omitted, repeated, and/or substituted. Accordingly, embodiments of the invention should not be considered limited to the specific arrangements of modules shown in FIG. 1B.

The software solution (161) is essentially the same as the configurable product (120) depicted in FIG. 1A above. For example, the software solution (161) may be an accounting software, a financial software, a business tax preparation application, a web service, other types of business financial management application, or any other solution. Similar to the configurable product (120) depicted in FIG. 1A, the software solution (161) may include an accounting engine, reporting engine, global tax model engine, payroll engine, and tax engine, etc.

The software solution (161) may be provided by an application service provider, such as a software as a service (SaaS). For example, the software solution (161) may be operated by an application service provider (ASP) operating the computer server (160) and accessed by the user (101) on a subscription basis. In one or more embodiments of the invention, the configuration engine (162) corresponds to a portion of the configuration service (110) and contribution management system (130) depicted in FIG. 1A above. For example, the configuration engine (162) may include the functionality of the authoring tools (130a) and the recommendation and catalog service (110c) described in reference to FIG. 1A above.

The repository (163) is configured to store data used or generated by the software solution (161) and the configuration engine (162). In one or more embodiments, the data stored in the repository (163) includes configuration data items (e.g., configuration data item A (164a), configuration data item B (164b), etc.) and user attributes (e.g., user attribute A (166a), user attribute B (166b), etc.). In one or more embodiments, the configuration data items and user attributes may be organized as a data file, a linked list, a data sequence, a database, a graphical representation, or any other suitable data structure. In one or more embodiments, the configuration data items and user attributes are stored in a graph database in the repository (163).

A user attribute (e.g., user attribute A (166a), user attribute B (166b), etc.) may include the geographical location and one or more business characteristics of a user (e.g., adopting user (151a), contributing user A (152a), contributing user B (153a), etc.). For example, the user attribute may include a country, city, district, etc. where the user resides or operates a business, as well as an industry, business size, business category, language, and/or other financial/operational parameters of the business operated by the user. In one or more embodiments, the user attribute of a contributing user (e.g., contributing user A (152a), contributing user B (153a), etc.) is stored in the repository (163). For example, the user attribute of the contributing user A (152a) is stored in the repository (163) as the user attribute A (166a). Similarly, the user attribute of the contributing user B (153a) is stored in the repository (163) as the user attribute B (166b).

A configuration data item (e.g., configuration data item A (164a), configuration data item B (164b), etc.) includes the aforementioned configurable UI elements, configurable workflow step/sequence, or configuration parameters that are described in reference to FIG. 1A above. In particular, the configuration data item is generated by a contributing user to configure a localized version of the software solution (161) for performing a pre-determined task in compliance with a local requirement of the contributing user. For example, the pre-determined task may be an accounting task, a report generation task, a tax preparation task, etc.

Each configuration data item stored in the repository (163) is assigned a search tag. The search tag is metadata assigned to a configuration data item to facilitate searching the content of the repository (163). For example, the configuration data item A (164a) is generated by the contributing user A (152a) and assigned the search tag A (165a). Similarly, the configuration data item B (164b) is generated by the contributing user B (153a) and assigned the search tag B (165b).

Each of the configuration data items stored in the repository (163) is associated with a type. For example, the configuration data item A (164a) may be one of many different types of configuration data items. In another example, the configuration data item B (164*b*) may a different type of configuration data item than the configuration data item A (164*a*). In one or more embodiments, the types of the configuration data items correspond to functional engines of the software solution (161). For example, each of an accounting engine, reporting engine, global tax model engine, payroll engine, and tax engine of the software solution (161) may be configured using a particular type of the configuration data item to perform various functions of the software solution (161). In one or more embodiments, a given type of configuration data item may correspond to multiple functional engines. For example, a language type may be utilized by more than one different functional engine.

Each type of the configuration data items conforms to a corresponding type specification. A type specification specifies details of the configurable UI elements, configurable workflow step/sequence, and/or configuration parameters based on the requirements of the functional engine(s) with which the type corresponds. Multiple configuration data items may be of the same type and conform to the same type specification. In other words, the type specification is a specification of a corresponding type of configuration data items. For example, the configuration data item A (164*a*) may be of a first type and conform to the requirement of the reporting engine of the software solution (161). Specifically, the configuration data item A (164*a*) conforms to the type specification that specifies details of the configurable UI elements, configurable workflow step/sequence, and/or configuration parameters required by the reporting engine. In another example, the configuration data item B (164*b*) may be of a second type and conform to the requirement of the tax engine of the software solution (161). Specifically, the configuration data item B (164*b*) conforms to the type specification that specifies details of the configurable UI elements, configurable workflow step/sequence, and/or configuration parameters required by the tax engine.

Each type of the configuration data items are associated with a set of system selected user attributes that are generally relevant to localizing or otherwise configuring the corresponding type of functional engine. In one or more embodiments, the set of system selected user attributes include a weight for each system selected user attribute to represent a level of relationship between the system selected user attribute and the configuration data item. The set of system selected user attributes and associated weights are described in a specification of the set of the system selected user attributes. For example, the system selected user attributes of the first type of the configuration data item may include the industry, language, business size, etc., of the user, which is generally relevant to localizing the reporting engine. In another example, the system selected user attributes of the second type of the configuration data item may include the country, district, and industry of the user, which is generally relevant to localizing the tax engine. Accordingly, a functional engine is localized in a similar manner for users sharing same attribute values for one or more system selected user attributes.

Each of the types may be one of either a layered type or a non-layered type. As used herein, a layered type provides a hierarchical structure that supports the insertion of one or more configuration data items (164*a*, 164*b*) into one or more other configuration data items (164*a*, 164*b*). Conversely, a non-layered type does not support such a hierarchical structure.

A first engine (e.g., a reporting engine, tax engine, accounting engine, payroll engine, etc.) may utilize a layered type; whereas a second engine, that is different than the first engine, may utilize a non-layered type. Accordingly, configuration data items (164*a*, 164*b*) conforming to the type specification of the first engine may be nested or recursively inserted into other configuration data items (164*a*, 164*b*) that conform to the type specification of the first engine. The insertion of one configuration data item (164*a*) into another configuration data item (164*b*) may be performed by the configuration engine (162) to generate a custom software solution (161) for an adopting user (151*a*). Conversely, configuration data items conforming to the type specification of the second engine (i.e., non-layered type) are not nested, and may be returned to the adopting user (151*a*) as retrieved from the repository (163) and without further customization (i.e., without first inserting one or more additional configuration data items within).

A layered type results in the nesting of multiple levels of configuration data items. In other words, a custom configuration data item may be generated by selecting and inserting within a first configuration data item (164*a*) one or more additional configuration data items (164*b*), and any of the additional configuration data items (164*b*) may include still further configuration data items (not shown) that are selected and inserted within. Each of the configuration data items (164*a*, 164*b*) may be selected based on the attributes of an adopting user (151*a*), and inserted into another configuration data item also selected based on the attributes of the adopting user (151*a*). For example, language specific UI elements may be selected and inserted into a country-specific payroll workflow of a payroll engine, for use by a specific user, based on the location, industry, etc. of the user.

In one or more embodiments, the nesting or insertion of a second configuration data item (164*b*) within a first configuration data item (164*a*) is enabled by way of a placeholder in the first configuration data item (164*a*). In one or more embodiments, a placeholder in the first configuration data item (164*a*) includes a key. As used herein, a key includes any field within a configurable element that is necessarily resolved as content before the configurable element may be returned to an adopting user (151*a*). In this way, a key within the first configuration data item (164*a*) may be a placeholder for the second configuration data item (164*b*), which is hierarchically below the first configuration data item (164*a*). For example, the second configuration data item (164*b*) may be a language-specific text field or button that is inserted within the first configuration data item (164*a*). As another example, the second configuration data item (164*b*) may be a city-specific workflow that is inserted as a step within the first configuration data item (164*a*), which is a state-specific workflow.

Thus, by nesting configuration data items (164*a*, 164*b*), a configurable software solution (161) may be localized in an increasingly granular manner. For example, a global tax model engine of the software solution (161) may be customized by a configuration engine (162) based on the city, county, state, and country of an adopting user (151*a*) by nesting increasingly local customizable tax workflows selected from the configuration data items (164). Still yet, the global tax model engine of the software solution (161) may be customized by the configuration engine (162) based on the location of the adopting user (151*a*), to present the tax engine in the native or local language of the adopting user (151*a*), by including language-specific configurable UI elements, selected from the configuration data items (164), within the software solution (161).

In one or more embodiments, a default set of configuration data items (164) is associated with a particular layered type. The default set of configuration data items (164) may include the upper-most level of a hierarchy of nested configuration data items. In this way, the default set of configuration data items (164) provides a structure for presenting lower levels of configuration data items (164) within a software solution (161), where the lower levels of configuration data items (164) are independent location-specific, language-specific, industry-specific, and/or business-specific configurable elements. Accordingly, using a single default set of configuration data items (164) for a global tax model engine, the configuration engine (162) generates a drastically different custom software solution (161) for a first adopting user (151a) than it would for a second adopting user (not shown), depending on the industries, locations, languages, businesses, etc. associated with the two adopting users.

The adopting user (151a) is one of the users (101) depicted in FIG. 1A above. Similarly, the contributing user (152a) is one of the contributors (102) depicted in FIG. 1A above. In one or more embodiments, the adopting user (151a) and the contributing user (152a) use the adopting user computer (151b) and the contributing user computer A (152b), respectively, to access the computer server (160).

The adopting user computer (151b) and the contributing user computer A (152b) may be any computing or communication device, such as a notebook computer, laptop computer, desk-side computer, tablet computer, smartphone, etc. For example, the adopting user (151a) and the contributing user (152a) may use the adopting user computer (151b) and the contributing user computer A (152b), respectively, to access the configuration engine (162) for configuring/localizing the software solution (161). In addition, the adopting user (151a) and the contributing user (152a) may use the adopting user computer (151b) and the contributing user computer A (152b), respectively, to access the software solution (161) for performing a pre-determined task, such as the aforementioned accounting task, report generation task, tax preparation task, etc.

A contributing user computer is configured to receive, from a contributing user, a configuration data item. For example, the contributing user computer A (152b) may be used by the contributing user A (152a) to access an authoring tool functionality of the configuration engine (162) to generate the configuration data item A (164a). In another example, the contributing user computer B (153b) may be used by the contributing user B (153a) to access the authoring tool functionality to generate the configuration data item B (164b).

A first localized version of the software solution (161) is generated by the configuration engine (162) using the configuration data item A (164a). Accordingly, the contributing user computer A (152b) accesses the first localized version of the software solution (161) to perform a pre-determined task of the contributing user A (152a). In one or more embodiments, the software solution (161) is a globally scaled software solution, such as the configurable product (120) depicted in FIG. 1A above. In such embodiments, the contributing user computer A (152b) accesses the first localized version of the software solution (161) via the computer network (110) to perform the pre-determined task in compliance with a local requirement of the contributing user A (152a). Similarly, the contributing user computer B (153b) accesses another localized version of the software solution (161) via the computer network (110) to perform the pre-determined task in compliance with a local requirement of the contributing user B (153a).

A contributing user computer is further configured to receive, from a contributing user and in conjunction to the configuration data item, a contributing user attribute specification. In particular, the contributing user attribute specification includes a selection from the set of system selected user attributes and corresponding user attribute values of the contributing user. Specifically, the selection specifies one or more user attributes from the set of system selected user attributes. For example, the contributing user computer A (152b) may be used by the contributing user A (152a) to access the authoring tool functionality of the configuration engine (162) to submit the contributing user attribute specification for indexing the configuration data item A (164a). In another example, in conjunction with submitting the configuration data item B (164b), the contributing user computer B (153b) may be used by the contributing user B (153a) to submit another contributing user attribute specification for indexing the configuration data item B (164b).

A contributing user attribute specification specifies a portion of the system selected user attributes and corresponding user attribute value(s) of the contributing user. For example, the contributing user attribute specification may specify a first user attribute and a second user attribute from the set of system selected user attributes. In particular, the first user attribute may describe a geographical location of the business operated by a corresponding user and the second user attribute may describe an industry where the business belongs.

A received configuration data item is stored in a graph database as an instance of a type specification. For example, the received configuration data item may be stored in an instance node coupled to a parent node storing the type specification. In one or more embodiments, the contributing user attribute specification is stored in the graph database by storing each user attribute value specified in the contributing user attribute specification. In particular, each contributing user attribute value may be stored in the graph database as an instance of a corresponding system selected user attribute.

The adopting user computer (151b) is configured to receive, from the adopting user (151a), a request for a recommended configuration data item of a particular type. In one or more embodiments, the request is sent to the configuration engine (162) to search in the repository (163). In return, the configuration engine (162) selects one or more applicable configuration data items, and generates a custom configuration data item, to localize the software solution (161) for the adopting user (151a). Accordingly, the adopting user computer (151a) is used by the adopting user (151a) to access a localized version of the software solution (161) via the computer network (110) to perform a pre-determined task, such as the aforementioned accounting task, report generation task, tax preparation task, etc.

A previously-generated configuration data item is selected and used to generate a custom configuration data item for an adopting user by matching the adopting user's attributes to the search tags of indexed configuration data items. For example, the search result selects the configuration data item A (164a) based on matching the user attributes of the adopting user (151a) to the search tag A (165a). The configuration data item A (164a) may be a UI element, workflow, etc., that is used to generate a customized version of the software solution for the adopting user (151a). In contrast, the configuration data item B (164b) may be excluded from the search result due to mismatch between the user attributes of the adopting user (151a) and the search tag B (165b).

Accordingly, in one or more embodiments, the computer server (160) is configured to (i) receive configuration data items from contributing users, (ii) generate search tags based on contributing user attribute specifications to index the received configuration data items, (iii) search the indexed configuration data items to select one or more recommended configuration data items in response to a request from an adopting user, and (iv) generate a custom configuration data item based on the selected configuration data items. In one or more embodiments, the computer server (160) performs these functions using the methods described in reference to FIGS. 2A and 2B, below.

Figure 2A:
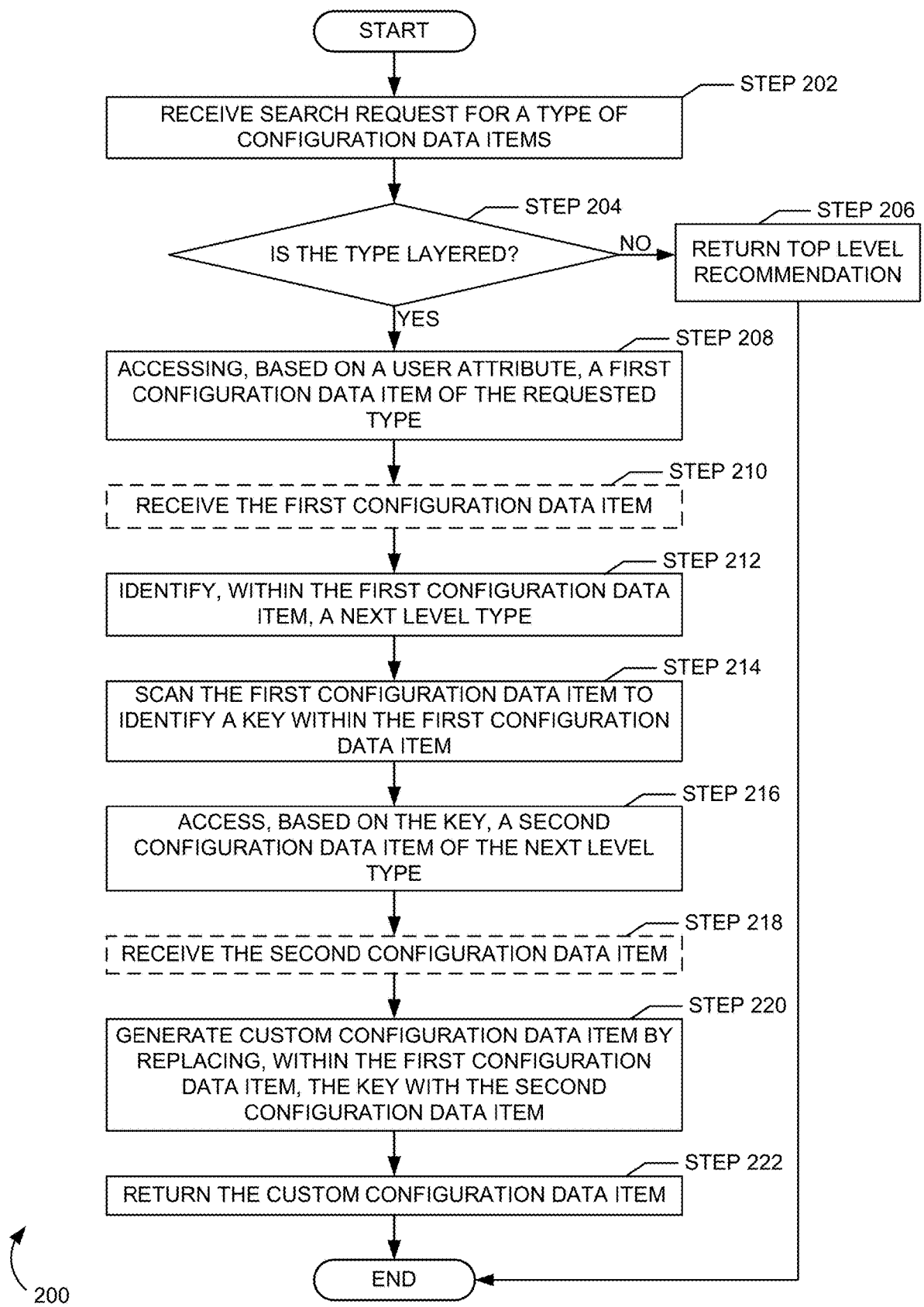
FIG. 2A shows a flowchart of a method for recommending content using layered types, in accordance with one or more embodiments of the invention.

FIG. 2A depicts a flowchart of a method (200) for generating custom content using layered types, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200) described in reference to FIG. 2A may be practiced using the MAP (150) of FIG. 1A, the computer server (160) of FIG. 1B, and/or the computing system (400) of FIG. 4A.

At Step 202, a search request is received. Moreover, the search request is for a type of configuration data items. In one or more embodiments, the search request may be received over a network. For example, the search request may be received over the Internet at a configuration service (110) from a user (101), as described in the context of the system A (100a) of FIG. 1A, or at a computer server (160) from an adopting user computer (151b), as described in the context of the system B (100b) of FIG. 1B. In one or more embodiments, the search request is received due to an adopting user's interaction with a configurable software solution. For example, the software solution may be accounting software that the user is performing an accounting process within, or the software solution may be a business tax preparation application that the user is using to prepare a tax filing.

The search request may include or otherwise is associated with user attribute values of the adopting user, also referred to as adopting user attribute values. For example, the search request may include a geographic identifier (e.g., city, county, state, country, etc.), a language, a company, an industry, etc. of the user, or any other information which may be relevant for localization of the software solution.

At Step 204, it is determined whether the type of configuration data items, which is targeted by the search request received at Step 202, is a layered type. In one or more embodiments, whether or not a type is layered depends on the functional engine that the type corresponds to. For example, a first engine may utilize layered types, while a second engine utilizes non-layered types. In one or more embodiments, each type specification may indicate whether or not the associated type is layered or non-layered. As an option, whether a type is layered may be tracked in a separate object. For example, a table, database, or other data structure may track available types and/or engines, in association with a layered or non-layered status for each. The contents of a type specification, table, database, or other data structure may be used to determine whether the type identified in the request is layered.

If it is determined, at Step 204, that the type is not layered (i.e., a non-layered type), then a top level recommendation of a configuration data item is returned, in response to the search request, at Step 206. In other words, based on a user attribute of an adopting user, a configurable user interface, a configurable workflow, and/or a configuration parameter are selected from a repository, such as a graph database, storing configurable user interfaces, configurable workflows, and/or configuration parameters. In one or more embodiments of the invention, the selection is based on a match between the user attribute of the user and user attributes of contributing users who provided the selected configurable user interface, the selected configurable workflow, or the selected configuration parameter.

In one or more embodiments, the configuration data item of a non-layered type, as returned at Step 206, may be used, unmodified, to configure a software solution for the adopting user. For example, one or more functional engines of a software solution are configured based on the selected configurable user interface, the selected configurable workflow, and/or the selected configuration parameter.

However, if it is determined, at Step 204, that the type is layered, then a first configuration data item of the type is accessed, at Step 208. In one or more embodiments, the first configuration data item may be accessed by a request from a configuration engine, such as the configuration engine (162) of the computer server (160) described in the context of FIG. 1B. The request sent at Step 208 may identify the type of configuration data item identified in the request received at Step 202. The request sent at Step 208 may include user attributes, as received from the user at Step 202. For example, the first configuration data item may be requested from a configuration engine, by requesting a configuration data item of a particular type and/or associated with one or more attributes of an adopting user. Alternatively, rather than making a request for a configuration data item, the information is accessed by the configuration data being supplied (e.g. based on known user attributes of the requested type) without a specific request being sent.

At Step 210, the first configuration data item may be optionally received depending on whether a push or a pull data topology is desired. In one or more embodiments, the first configuration data item is received from a repository, such as a graph database, or from a configuration engine. In one or more embodiments, the first configuration data item may be a default configuration data item, or included in a default set of configuration data items, selected by the configuration engine based on the requested type. In other words, the first configuration data item may be a default configurable user interface, a default configurable workflow, and/or a default configuration parameter that provides a structured hierarchical relationship for customization using additional configuration data items. In one or more embodiments, the first configuration data item may be selected, from the repository, by a configuration engine based on a user attribute of a user that originated the search request received at Step 202. For example, the configuration engine may match the user attributes of the user to search tags of the first configuration data item. More specifically, the first configuration data item may be a default workflow or interface for entering tax information, based on the user's country and/or industry.

At Step 212, a type of the next hierarchical level is identified. The type of the next hierarchical level is identified using the contents of the first configuration data item. For example, a data field within the first configuration data item may explicitly designate the next hierarchical level. In one or more embodiments, the first configuration data item may be a top level configuration data item containing one or more placeholders, into which one or more additional configuration data items, respectively, may be inserted. Accordingly, the first configuration data item may indicate another type of configuration data items that are used for the next hierarchical level.

Also, at Step 214, the first configuration data item is scanned to identify a key within the first configuration data. A key is any field within the first configuration data item that will be resolved as content before the first configuration data is returned and used to configure a software solution for an adopting user. In one or more embodiments each key may include a descriptor that identifies a configurable element that should replace the key within the first configuration data item. Accordingly, scanning the first configuration data item may include any operation that examines the contents of the first configuration data item to recognize a predetermined pattern of symbols.

In one or more embodiments, the keys are formatted in a particular manner to facilitate identification of the keys within the configuration data items. For example, a key may be formatted to include a specific sequence of characters that designate the start and/or end of the key. As an option, a key may include a prefix that is associated with a type. Additional text after the prefix, referred to as an identifier, may be utilized to select a configuration data item of the type associated with the prefix. For example, a key of "LANG:// [identifier]" within the first configuration data item may be found by scanning the first configuration data item for "LANG://". This particular descriptor may be searched for based on the type of the next hierarchical level identified in the first configuration data item. For example, the first configuration data item may indicate that the next hierarchical level is the language type. Accordingly, based on this identification, keys specific to the language type may be searched for in the first configuration data item. An identifier may be any sequence of symbols (i.e., characters) that can be used to request a configuration data item.

Based on the key in the first configuration data item, a second configuration data item is accessed, at Step 216. The second configuration data item is of the type of the next level, as identified at Step 212. For example, if the next level is identified as a rules type at Step 212, then the request for the second configuration data item is for configuration data items of the rules type. Thus, a key within a given level of content may be used to initiate a retrieval operation that obtains further content, where the further content replaces the key in the given level of content. Alternatively, rather than making a request for a second configuration data item, the information is accessed by the second configuration data being supplied (e.g. based on known user attributes of the requested type) without a specific request being sent.

The request for the second configuration data item may include one or more attributes of the user, from which the search request was received at Step 202. In this way, for example, a set of rules that are specific to the user may be requested based on the contents (e.g., next level type, keys, etc.) of the first configuration data item.

Next, a configuration engine accesses the second configuration data item. In response to accessing, the configuration engine traverses a graph database in search of the second configuration data item based on a request or other supplied information. During the traversal, the configuration engine computes search tag matching scores by comparing attribute values of the user with attribute values of users that contributed configuration data items of the next level type. In one or more embodiments, the selection of the second configuration data item is based on a match between user attributes of the user and user attributes of contributing users that provided the configuration data items of the next level type. A configuration data item with the highest matching score is returned by the configuration engine as the second configuration data item.

Accordingly, at Step 218, the second configuration data item may be optionally received depending on whether a push or a pull data topology is desired. In one or more embodiments, the second configuration data item is received from a repository, such as the graph database, or from the configuration engine.

The second configuration data item may be a user interface element, such as text, a graphic, a button, etc. The second configuration data item may be a workflow, a calculation (e.g., for verification or validation), or a rule. For example, if the search request received at Step 202 is for configuration data items for the type of tax compliance, a default set of tax compliance rules may be optionally received at Step 210. Moreover, based on the next level type of the default tax compliance rules (e.g., state-level tax compliance rules, etc.), keys within the default set of tax compliance rules, and/or attributes of the user that originated the request, the second configuration data item may include local or regional tax compliance rules that are specific to a location of the user, or a business associated with the user. For example, the second configuration data item may include California-specific validation rules, New York-specific validation rules, Nebraska-specific validation rules, etc.

In one or more embodiments, the second configuration data item is a configuration parameter that provides a structured hierarchical relationship for customization using still additional configuration data items. In other words, the second configuration data item includes one or more keys, and still additional configuration data items may be retrieved and inserted within the second configuration data item based on the keys, before or concurrently with the insertion of the second configuration data item into the first configuration data item. In this way, the various engines (120a, 120b, 120c, 120d, 120e) of the configurable product (120) of FIG. 1A may be configured in an increasingly granular manner, depending on the type specification associated with the engine, and the adopting user for which the engine is being configured. An exemplary series of steps for recursively combining more than two layers of configuration data items is described below in the context of FIG. 2B.

At Step 220, a custom configuration data item is generated. The custom configuration data item is generated by replacing the key, within the first configuration data item (identified at Step 214), with the second configuration data item (received at Step 218). It is understood that, in one or more embodiments, the first configuration data item may include multiple keys. In such embodiments, each of the keys may be replaced by a corresponding configuration data item. Accordingly, using the method (200) of FIG. 2A, a request for a layered type of configuration data items may result in the generation of a custom configuration data item that that is created during run-time based on one or more attributes of an adopting user.

Also, at Step 222, the custom configuration data item is returned. Returning the custom configuration data item includes any operation that enables use of the custom configuration data item for localizing a software solution. In one or more embodiments, the custom configuration data item is returned to a computer server. Using the custom configuration data item, the computer server may localize a software solution for an adopting user. In particular, a functional engine of the software solution may be configured based on the custom configuration data item, which may include a selected configurable user interface, a selected configurable workflow, and/or a selected configuration parameter. After the functional engine of the software solution is configured for a user, a pre-determined task may be performed by the user. For example, in response to user input according to a selected configurable workflow, the functional engine may be executed, and/or user input may be received from the user via a selected configurable user interface.

Thus, in the manner set forth above, the custom configuration data item includes a combination of configuration data items from various hierarchical levels of types of configuration data items. For this reason, the custom configuration data item is different from any other single configuration data item stored in a repository.

Figure 2B:
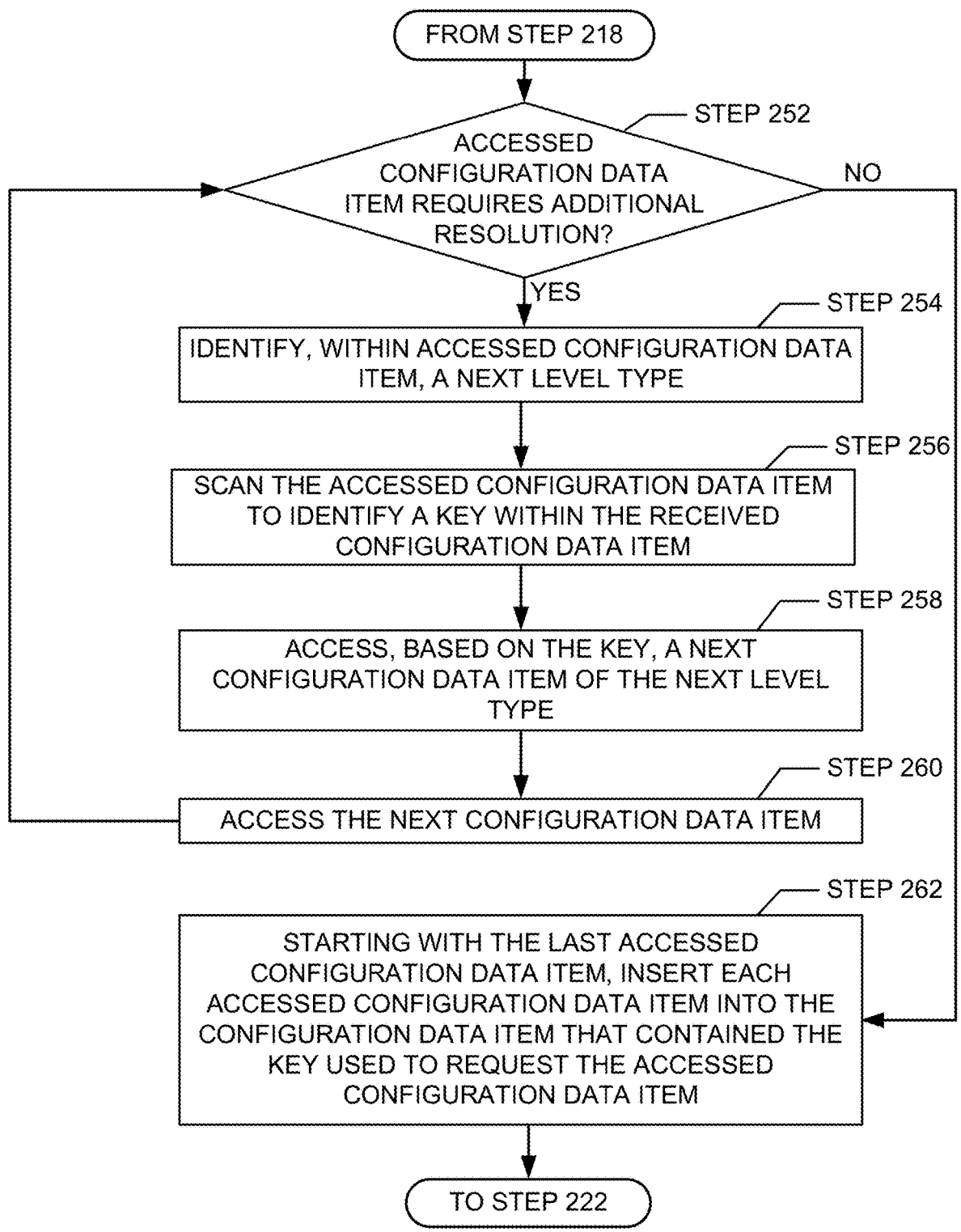
FIG. 2B shows a flowchart of a method for recommending content using layered types, in accordance with one or more embodiments of the invention.

FIG. 2B depicts a flowchart of a method (250) for generating custom content using layered types, in accordance with one or more embodiments of the invention. In one or more embodiments, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method (250) described in reference to FIG. 2B may be practiced using the market acceleration platform (150) of FIG. 1A, the computer server (160) of FIG. 1B, and/or the computing system (400) of FIG. 4A.

The method (250) of FIG. 2B may substantially replace Step 220 of the method (200) of FIG. 2A, described above. In particular, the steps of the method (250), described below, may be performed when the second configuration data item, received at Step 218, is of a layered type. Moreover, the steps of the method (250) may be performed when one or more additional keys are included in the second configuration data item.

At Step 252, it is determined whether the last received configuration data item will require additional resolution. In one or more embodiments, whether the last received configuration data item requires additional resolution is determined based on whether the last received configuration data item includes a field identifying the type of a next level, and/or by determining whether the last received configuration data item includes a key. In other words, the last received configuration data item requires additional resolution if the last received configuration data item includes a field identifying the type of a next level, and/or includes a key.

The last received configuration data item may be the second configuration data item, received at Step 218, if Step 252 is performed directly from Step 218 after receiving the second configuration data item. Accordingly, in such instances, whether the second configuration data item will require additional resolution may be determined by scanning the contents of the second configuration data item to identify a key and/or a next level. However, the last received configuration data item may be a third received configuration data item, a fourth received configuration data item, etc., any of which may be scanned to identify a key and/or a next level.

If it is determined that the received configuration data item requires additional resolution, then a type of the next hierarchical level is identified at Step 254. The type of the next hierarchical level is identified based on the contents of the last received configuration data item. In one or more embodiments, a data field within the last received configuration data item explicitly designates the next hierarchical level.

At Step 256, the received configuration data item is scanned to identify a key within the received configuration data. Moreover, based on the key, a next configuration data item is accessed, at Step 258. The next configuration data item of is of the type of the next hierarchical level, as identified at Step 254. A key within a given level of content (i.e., configuration data item) may be used to initiate a retrieval operation that obtains further content (i.e., anther configuration data item), where the further content replaces the key in the given level of content. In one or more embodiments, accessing the next configuration data item includes a request including one or more attributes of the user from which the search request was received at Step 202. In this way, for example, multiple levels of user-specific content may be requested based on the contents (e.g., next level type, keys, etc.) of the received configuration data item.

Next, a configuration engine accesses the next configuration data item. In response, the configuration engine traverses a graph database in search of the next configuration data item. During the traversal, the configuration engine computes search tag matching scores by comparing attribute values of the user with attribute values of users that contributed configuration data items of the next level type, as identified at Step 254. In one or more embodiments, the selection of the next configuration data item is based on a match between user attributes of the user and user attributes of contributing users that provided the configuration data items of the next level type. A configuration data item with the highest matching score is returned by the configuration engine as the next configuration data item.

Accordingly, at Step 260, the next configuration data item is received. In one or more embodiments, the next configuration data item is received from a repository, such as a graph database, or from the configuration engine. The next configuration data item may be a user interface element, such as text, a graphic, a button, etc. The next configuration data item may be a workflow, a calculation (e.g., for verification or validation), or a rule.

In one or more embodiments, the next configuration data item is a configuration parameter that provides a structured hierarchical relationship for customization using further configuration data items. In other words, further configuration data items are retrieved and inserted within the next configuration data item. In particular, after receiving the next configuration data item, the method (250) returns to Step 252, where it is determined whether the next configuration data item requires additional resolution. If the next configuration data item requires additional resolution, then the Steps 254-260 is performed at least once more. In this manner, multiple levels of layered types of configuration data items are retrieved, each of which is retrieved based on the contents of a configuration data item of the previous level and the attributes of an adopting user.

However, if it is determined, at Step 252, that the next configuration data item does not require further resolution, then the method (250) proceeds to Step 262. For example, if the next configuration data item does not include an identification of a next level type, or does not include a key, then the method (250) may proceed to Step 262.

At Step 262, starting with the last received configuration data item, each received configuration data item is inserted into a given configuration data item that contained the key used to access the received configuration data item. For example, if a first configuration data item includes a first key, then the first key is used to access a second configuration data item. Moreover, a second key within the second configuration data item is used to access a third configuration data item. If the third configuration data item does not include a key that needs to be resolved, then the third configuration data item is inserted within the second configuration data item, in place of the second key. Also, the second configuration data item—now containing the third configuration data item in place of the second key—is inserted within the first configuration data item, in place of the first key. In this way, the first configuration data item may be customized for a user, as needed, based on one or more additional layers of configuration data items. Also, in this way, a matrix of substitutions may be enabled, all the way back to the first retrieved configuration data item.

Using the layered recommendation system and method described above, the creation and maintenance of content is greatly simplified. In particular, by creating a generic instance of top-level content (i.e., a default set of configuration data items) that may be recursively customized across industries, locations, etc., based on the attributes of a requesting user, content is customized in an unlimited number of ways at run-time. Accordingly, rather than store hundreds or thousands of different instances of the same content, such as, for example, the different language-specific, location-specific, and industry-specific possible permutations of the same content, the content is broken up into discrete re-usable segments that are assembled as needed to provide a specifically adapted software solution.

FIGS. 3A, 3B, 3C, 3D, and 3E, depict an example of content recommendations using layered types of configuration data items, in accordance with one or more embodiments. Such recommendations may be practiced using the system A (100a) of FIG. 1A, the system B (100b) of FIG. 1B, the computing system (400) of FIG. 4, and/or be based on the methods (200 and 250) of FIG. 2A and FIG. 2B.

Figure 3A:
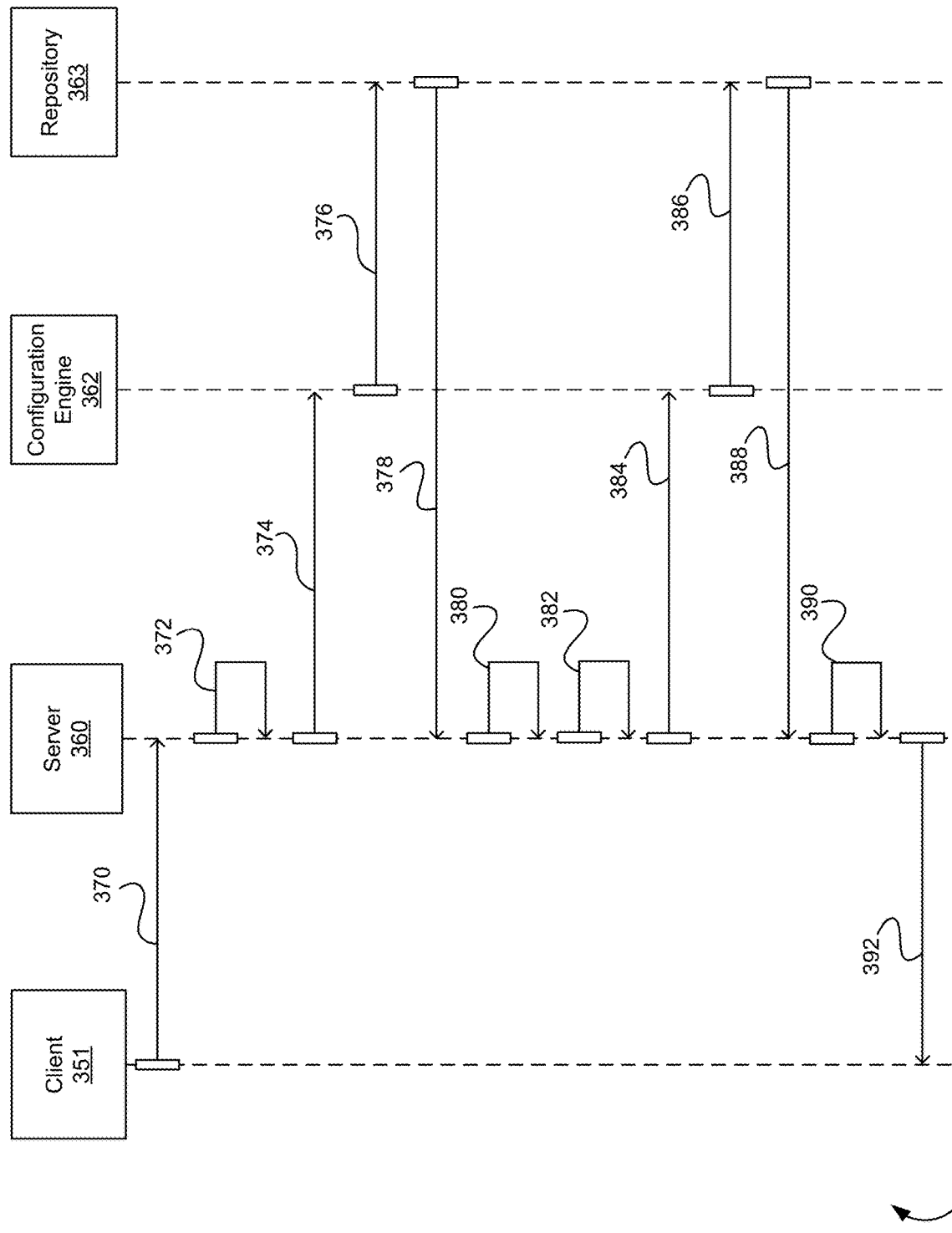
FIGS. 3A, 3B, 3C, 3D, and 3E depict examples of content recommendation using layered types, in accordance with one or more embodiments of the invention.

FIG. 3A depicts a communication flow (350) of communications between a client (351), a server (360), a configuration engine (362), and a repository (363). The client (351) may be substantially identical to the adopting user computer (151b) described in the context of FIG. 1B. In particular, the client (351) may be used by an adopting user to access a global tax model engine (302) depicted in FIGS. 3B-3E. For the purposes of this description, the server (360) is substantially identical to the computer server (160) described in the context of the system B (100b) of FIG. 1B. Similarly, the configuration engine (362) is substantially identical to the configuration engine (162), and the repository (363) is substantially identical to the repository (163), each described above in the context of the system B (100b) of FIG. 1B. Thus, in one or more embodiments, each of the configuration engine (362) and repository (363) may reside on the server (360).

Figure 3B:
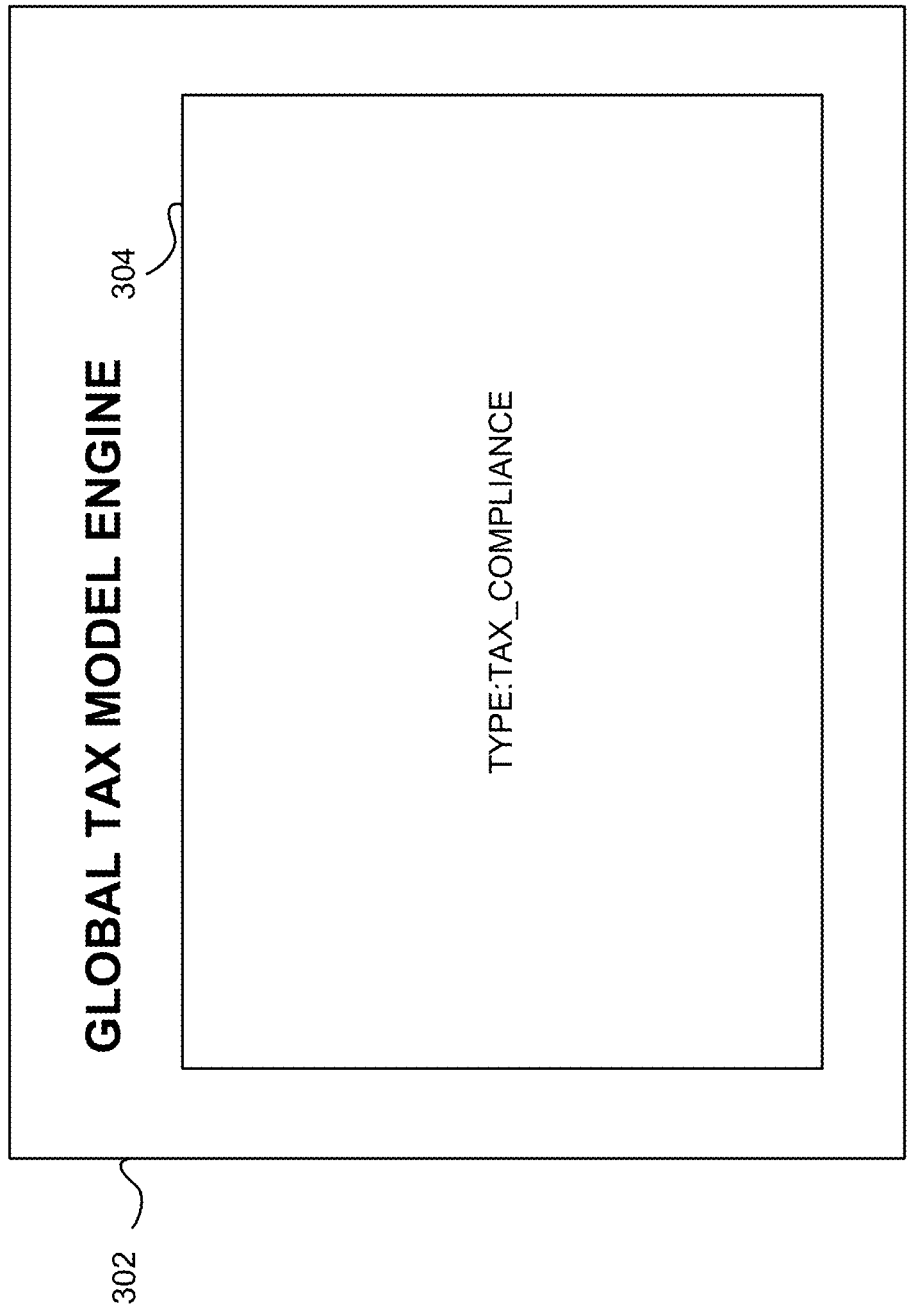

As noted, a user at the client (351) interacts with a global tax model engine (302), which is a configurable product. The global tax model engine (302) may be accessible to the client (351) via the server (360). FIGS. 3B, 3C, 3D, and 3E depict the resolution of configuration data items for the global tax model engine (302), based on attributes of the user at the client (351), across multiple levels of layered types. In particular, FIG. 3B depicts how a generic, top-level version of the global tax model engine (302), which is being accessed by the client (351), is stored and/or initially retrieved. For the purposes of this disclosure, the global tax model engine (302) is substantially identical to the global tax model engine (120c) discussed in the context of FIG. 1A.

In one or more embodiments, the global tax model engine (302) is an internationalized software solution that can be localized and adapted depending on the attributes of an accessing user. In particular, locale-specific segments may be used to customize the global tax model engine (302), depending on the accessing user.

The global tax model engine (302) may be used by the user at the client (351) to generate tax filings, determine income tax requirements, calculate tax liabilities, validate tax compliance, etc. As specifically depicted in FIG. 3B, the global tax model engine (302) includes workflow (304) of the type tax compliance. The workflow (304) is a configuration data item that may be retrieved based on user attributes.

Referring again to FIG. 3A, based on the user's activities at the client (351), the client (351) sends a request (370) to the server (360). The request (370) is for a type of configuration data items. In particular, the request (370) is for a configuration data item of the tax compliance type, based on the user's interaction with the global tax model engine (302). The request (370) may include one or more attributes of the user, such as the user's location, business, industry, etc. The request (370) may be a request for the default set of configuration data items of the tax compliance type.

In response to the request (370), the server (360) determines (372) that the type requested by the client (351) is of a layered type. Moreover, in response to determining that the type is layered, the server (360) sends a request (374) to the configuration engine (362) that requests a first configuration data item of the layered type. Specifically, the request (374) requests a configuration data item of the tax compliance type, as required by the global tax model engine (302). The request (374) may include one or more attributes of the user at the client (351). In response to receiving the request (374), the configuration engine (362) traverses the repository (363) in search of a first configuration data item of the specified type. In one or more embodiments, the configuration engine (362) computes search tag matching scores by comparing attribute values of the user at the client (351) with attribute values of users that contributed configuration data items of the specified type in the repository (363). Upon identifying an appropriate match, the first configuration data item is returned (378) to the server (360).

Figure 3C:
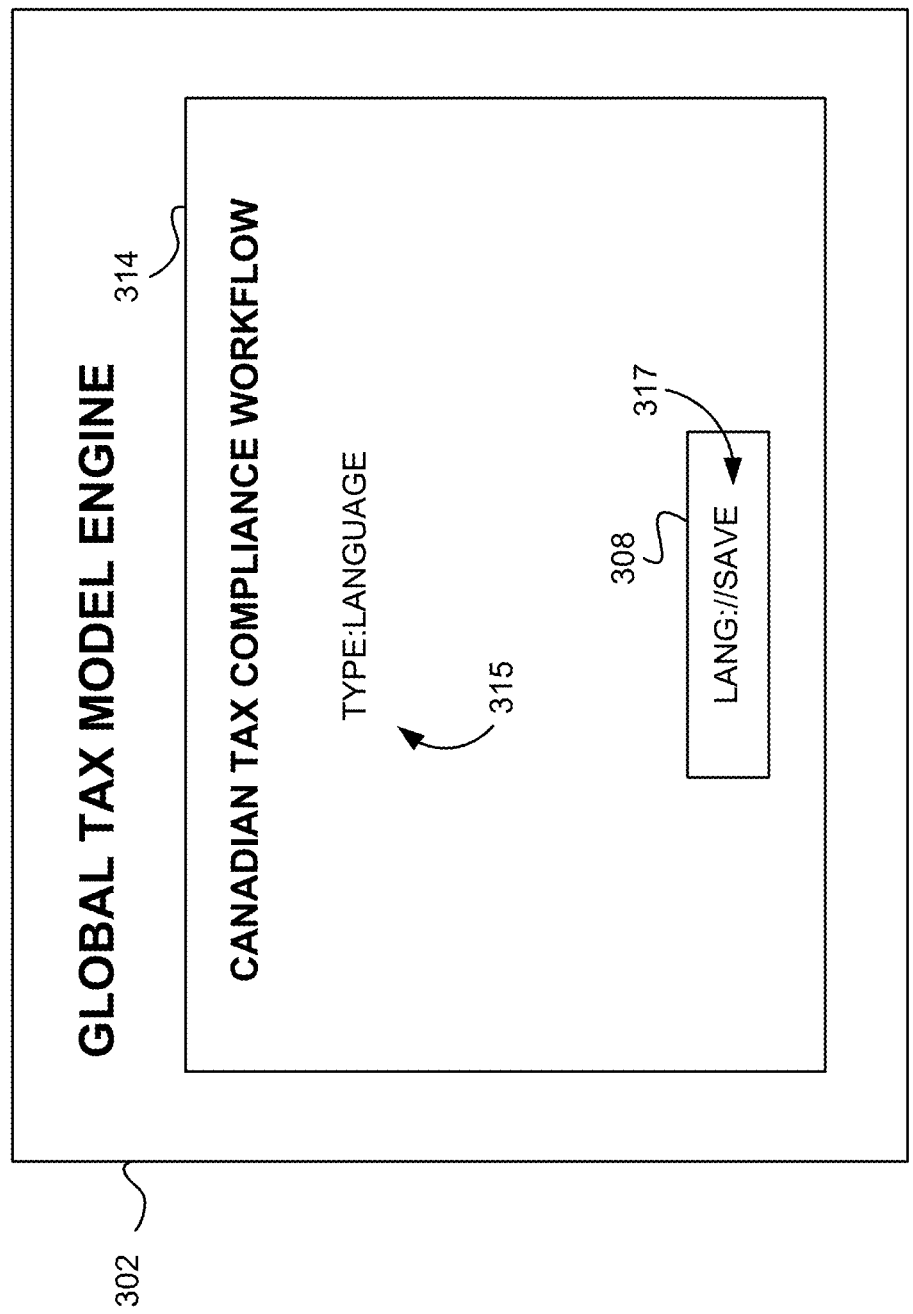

In particular, referring now to FIG. 3C, the first configuration data item is a Canadian tax compliance workflow (314). The Canadian tax compliance workflow (314) has been returned as the first configuration data item based on various attributes of the user at the client (351). Specifically, the user is located in Canada, and is managing the operations of a business with an address in Canada. In one or more embodiments, the tax compliance workflow (314) is specifically selected based on the province, county, city, etc., of the user within Canada, any of which may be passed as attributes to the configuration engine (362). For example, the tax compliance workflow (314) includes validation rules for the province, county, or city of the user.

Referring again to FIG. 3A, in response to receiving the first configuration data item, the server (360) evaluates the first configuration data item to identify whether additional resolution of the first configuration data item is needed. In particular, the server (360) determines (380) that the first configuration data item identifies a type of configuration data items for a next hierarchical level. Moreover, the server (360) determines (382) that the first configuration data item includes a key. In other words, the server (360) identifies a next level type, and identifies a key for obtaining a configuration data item of that type.

In particular, and referring again to FIG. 3C, the Canadian tax compliance workflow (314) includes a field (315) that identifies language as the next type. Also, the Canadian tax compliance workflow (314) includes a key that will be resolved using the language type. More specifically, the Canadian tax compliance workflow (314) includes a user interface element —a button (308)—that includes a key (317) with a "LANG://" descriptor. The contents of the first configuration data item (i.e., the Canadian tax compliance workflow (314)) may be scanned for all instances of this descriptor after identifying language as the next hierarchical type. Also the key (317) includes an identifier: "SAVE".

Referring again to FIG. 3A, in response to identifying the key (317) for the next type, the server (360) sends a request (384) to the configuration engine (362) that requests a second configuration data item of the next type. The request (384) may include the key (317), or a portion thereof. For example, the request (384) may include the identifier "SAVE". The request (384) may include one or more attributes of the user at the client (351). For example, the request (384) may include a location or preferred language of the user at the client (351).

In response to receiving the request (384), the configuration engine (362) traverses the repository (363) to identify the second configuration data item. The configuration engine (362) may select the second configuration data item from the repository (363) based on a match between user attributes of the user at the client (351), and user attributes of contributing users that provided various configuration data items of the next level type. A configuration data item with the highest matching score is returned (388) from the repository (363) to the server (360), as the second configuration data item.

After receiving the second configuration, the server (360) generates (390) a custom configuration data item. The custom configuration data item is generated by replacing the key within the first configuration data item with the second configuration data item. Moreover, using the custom configuration data item, the server (360) configures the global tax engine accessed by the client (351), and the global tax engine (302), as specifically configured for the user, is returned in a response (392) to the client (351).

Figure 3D:
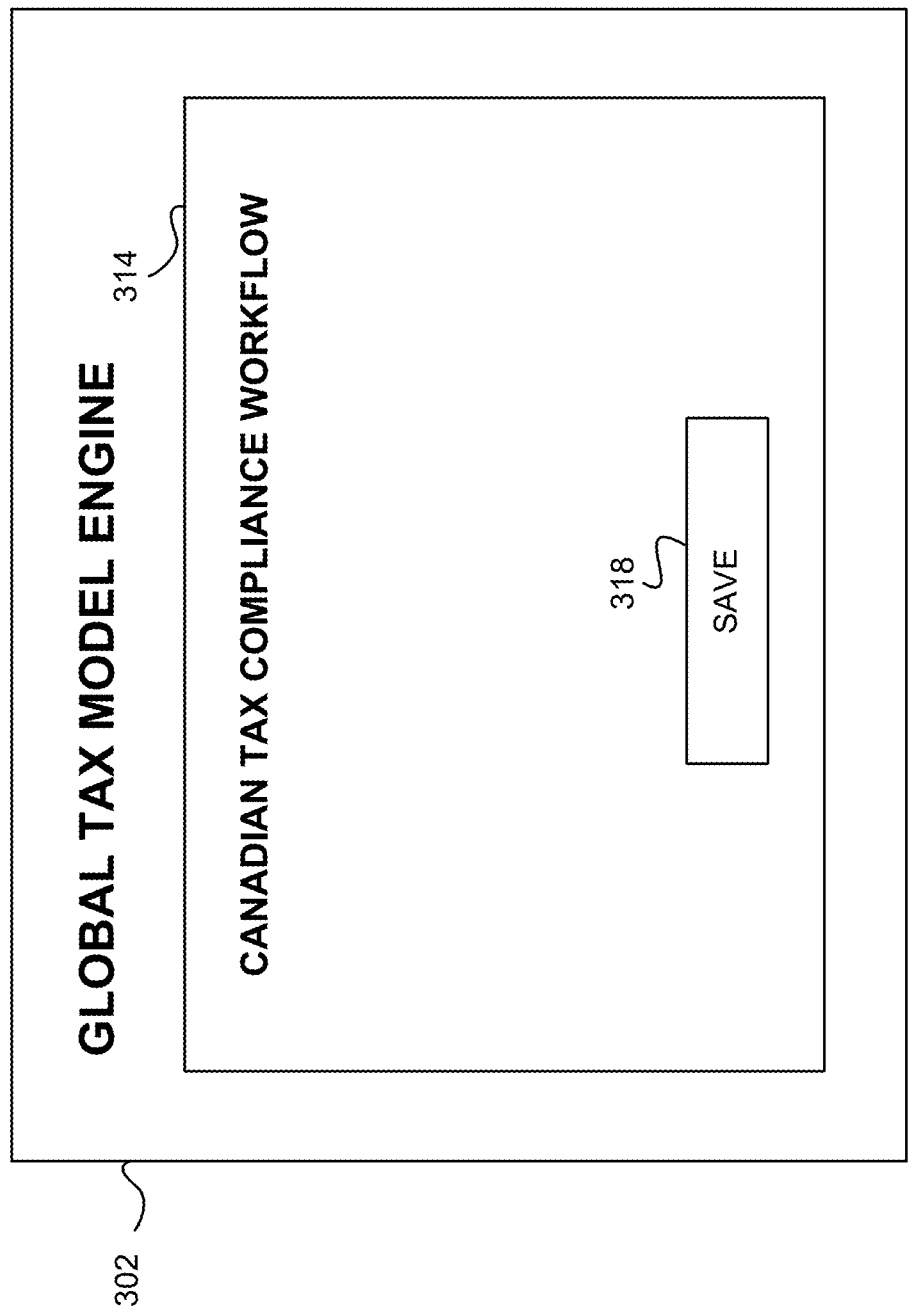
Figure 3E:
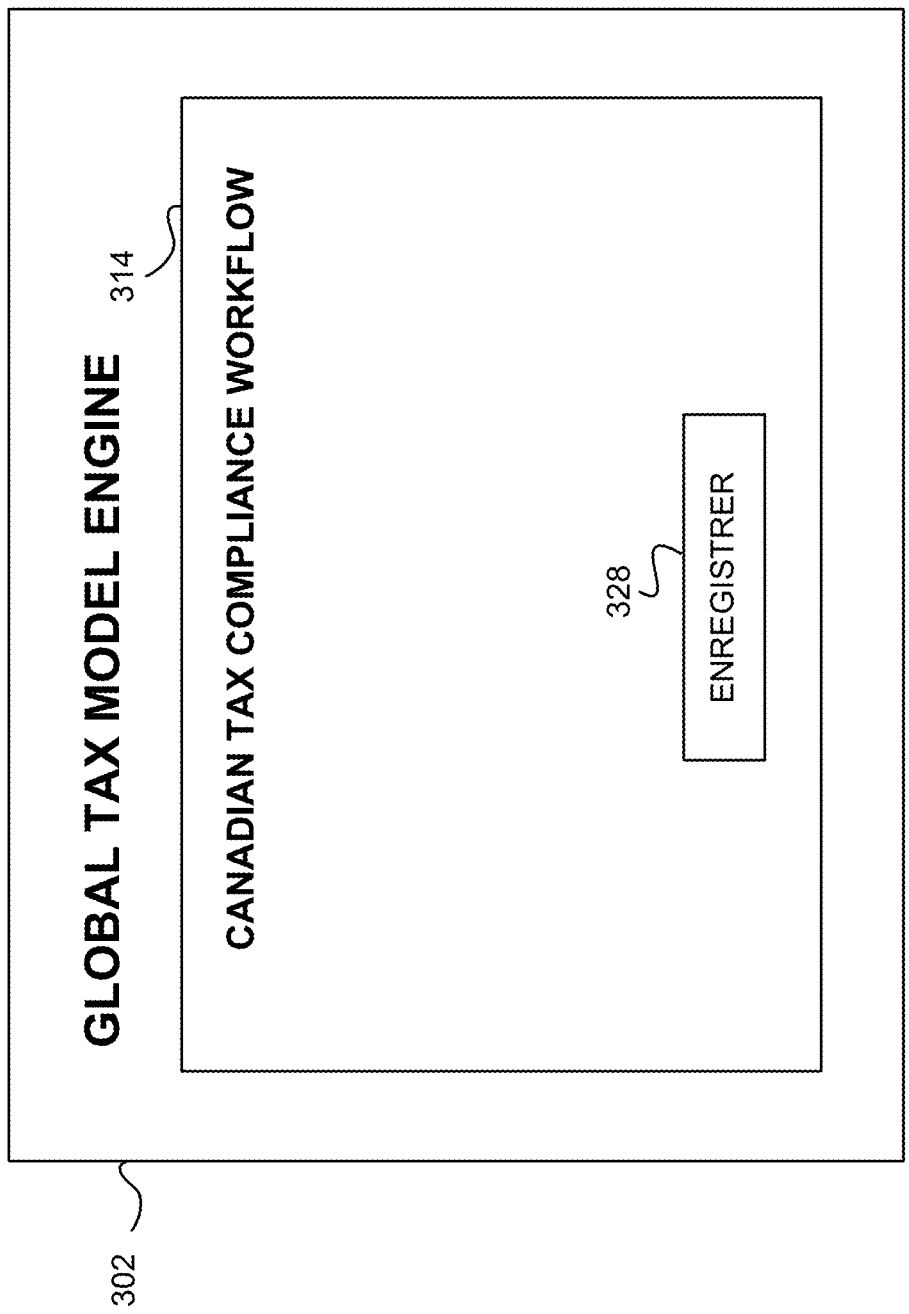

Referring now to FIGS. 3D and 3E, two possible options of a specifically configured version of the global tax engine (302), as returned to the client (351) are depicted. Referring to FIG. 3D, specifically, based on user attributes indicating that the user at the client (351) speaks English, the configuration engine (362) returns, as the second configuration data item, the English translation of the word "save". Accordingly, for an English-speaking user in Canada, the tax compliance workflow (314) of the global tax model engine (302) includes a save button (318) displaying the English word "SAVE". Selection of the button (318), while the user is interacting with the Canadian tax compliance workflow (314), will save the user's progress in the workflow (314).

However, and referring to FIG. 3E, if user attributes indicate that the user at the client (351) prefers speaking French, the configuration engine (362) returns, as the second configuration data item, the French translation of the word "save". Accordingly, for a French-speaking user in Canada, the tax compliance workflow (314) of the global tax model engine (302) includes a save button (328) displaying the French word "ENREGISTRER". Selection of the button (328) may have substantially the same effect as selection of the button (318), however the elements of the global tax engine model (302) have been configured specifically for a user at the client (351).

Accordingly, a specifically configured software solution is generated for a user of the client (351) in response to the request (370) from the client (351). Moreover, the specifically configured software solution is returned in a response (392) to the client (351). The specifically configured software solution may include workflows, user interface elements, configuration parameters that have been recursively selected based on attributes of the user.

Figure 4A:
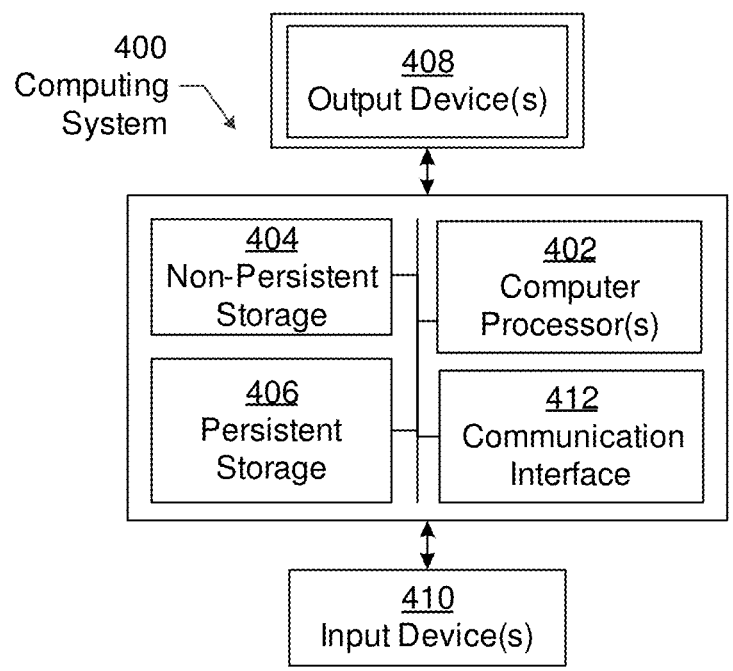
FIG. 4A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
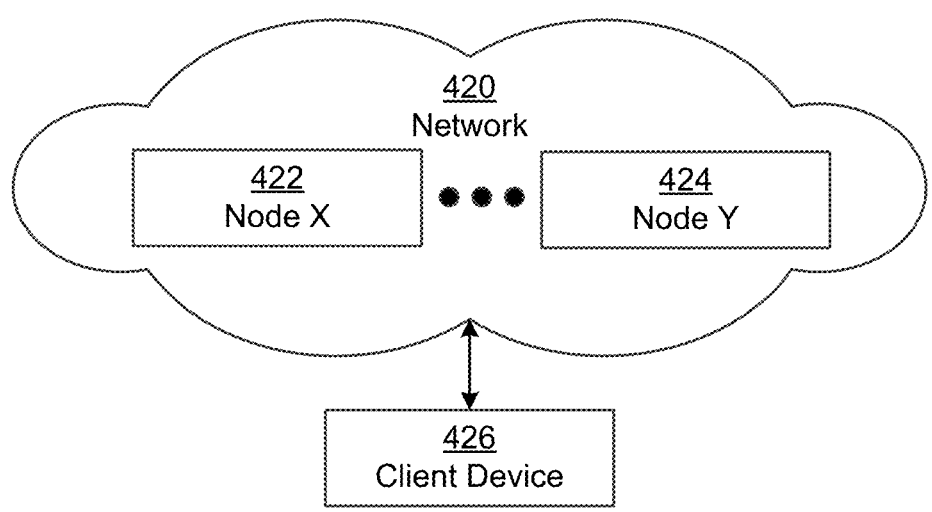
FIG. 4B shows a group of computing systems, in accordance with one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to configure a localizable software solution, comprising:
   receiving a search request to search a requested type of configuration data items, wherein the search request includes at least one user attribute;
   in response to the search request, accessing a first configuration data item of the requested type;
   scanning contents of the first configuration data item to identify a key within the first configuration data item;
   accessing, by resolving the key within the first configuration data item and based on the at least one user attribute, a second configuration data item of a second type, wherein the key comprises a prefix associated with the second type;
   scanning contents of the second configuration data item to identify a second key within the second configuration data item;
   requesting, using the second key within the second configuration data item, a third configuration data item of a third type;
   receiving the third configuration data item;
   generating a custom configuration data item by:
     replacing, within the second configuration data item, the second key with the third configuration data item, and
     after replacing the second key with the third configuration data item, replacing, within the first configuration data item, the key with the second configuration data item; and
   returning the custom configuration data item to a configuration engine, wherein the configuration engine localizes the localizable software solution using the custom configuration data item.

2. The method of claim 1, further comprising:
   in response to receiving the search request, determining that the requested type of configuration data items comprises a layered type;
   wherein the contents of the first configuration data item are scanned in response to determining that the requested type of configuration data items comprises the layered type.

3. The method of claim 1, further comprising:
   identifying, within the first configuration data item, the second type as a next level of a configuration data item hierarchy.

4. The method of claim 3, wherein the first configuration data item comprises a default configuration data item of the requested type.

5. The method of claim 1, wherein accessing the first configuration data item includes a request comprising the at least one user attribute, and accessing the second configuration data item includes a request comprising the at least one user attribute.

6. The method of claim 5, wherein the at least one user attribute includes a location of a client that originated the search request.

7. A system, comprising:
   a hardware processor and memory;
   a localizable software solution;
   a configuration engine operable to configure the localizable software solution;
   a repository; and software instructions stored in the memory and configured to execute on the hardware processor, which when executed cause the hardware processor to:
- receive a search request to search a requested type of configuration data items stored in the repository, wherein the search request includes at least one user attribute;
- in response to the search request, access, from the configuration engine, a first configuration data item of the requested type;
- scan contents of the first configuration data item to identify a key within the first configuration data item;
- access, from the configuration engine, by resolving the key within the first configuration data item and based on the at least one user attribute, a second configuration data item of a second type, wherein the key comprises a prefix associated with the second type;
- scan contents of the second configuration data item to identify a second key within the second configuration data item;
- request, using the second key within the second configuration data item, a third configuration data item of a third type;
- receive the third configuration data item;
- generate a custom configuration data item by:
  - replacing, within the second configuration data item, the second key with the third configuration data item, and
  - after replacing the second key with the third configuration data item, replacing, within the first configuration data item, the key with the second configuration data item; and
- return the custom configuration data item to the configuration engine, wherein the configuration engine localizes the localizable software solution using the custom configuration data item.

8. The system of claim 7, wherein the request for the first configuration data item includes the at least one user attribute, and the request for the second configuration data item includes the at least one user attribute.

9. The system of claim 8, wherein the repository includes a graph database.

10. The system of claim 9, wherein the first configuration data item is indexed in the graph database.

11. The system of claim 10, wherein the first configuration data item is stored in the graph database in association with first metadata, the second configuration data item is stored in the graph database in association with second metadata, and both the first metadata and the second metadata match the at least one user attribute.

12. The system of claim 7, wherein the software instructions cause the hardware processor to:
- in response to receiving the search request, determine that the requested type of configuration data items comprises a layered type;
- wherein the contents of the first configuration data item are scanned in response to determining that the requested type of configuration data items comprises the layered type.

13. A non-transitory computer readable medium storing instructions, the instructions, when executed by a computer processor, comprising functionality for:
- receiving a search request to search a requested type of configuration data items, wherein the search request includes at least one user attribute;
- in response to the search request, accessing a first configuration data item of the requested type;
- scanning contents of the first configuration data item to identify a key within the first configuration data item;
- accessing, by resolving the key within the first configuration data item and based on the at least one user attribute, a second configuration data item of a second type, wherein the key comprises a prefix associated with the second type;
- scanning contents of the second configuration data item to identify a second key within the second configuration data item;
- requesting, using the second key within the second configuration data item, a third configuration data item of a third type;
- receiving the third configuration data item;
- generating a custom configuration data item by:
  - replacing, within the second configuration data item, the second key with the third configuration data item, and
  - after replacing the second key with the third configuration data item, replacing, within the first configuration data item, the key with the second configuration data item; and
- returning the custom configuration data item.

14. The non-transitory computer readable medium of claim 13, the instructions, which when executed cause the hardware processor to perform:
- in response to receiving the search request, determining that the requested type of configuration data items comprises a layered type;
- wherein the contents of the first configuration data item are scanned in response to determining that the requested type of configuration data items comprises the layered type.

15. The non-transitory computer readable medium of claim 13, the instructions, which when executed cause the hardware processor to perform:
- identifying, within the first configuration data item, the second type as a next level of a configuration data item hierarchy.

16. The non-transitory computer readable medium of claim 13, wherein the first configuration data item comprises a default configuration data item of the requested type.

17. The non-transitory computer readable medium of claim 13, wherein accessing the first configuration data item includes a request comprising the at least one user attribute, and accessing the second configuration data item includes a request comprising the at least one user attribute.

18. The non-transitory computer readable medium of claim 17, wherein the at least one user attribute includes a location of a client that originated the search request.

* * * * *